US011381371B2

(12) United States Patent
Lin (10) Patent No.: US 11,381,371 B2
(45) Date of Patent: Jul. 5, 2022

(54) SECONDARY CELL ACTIVATION WITH BEAM MANAGEMENT IN NEW RADIO MOBILE COMMUNICATIONS

(71) Applicant: MediaTek Inc., Hsinchu (TW)

(72) Inventor: Hsuan-Li Lin, Hsinchu (TW)

(73) Assignee: MediaTek Inc.

( * ) Notice: Subject to any disclaimer, the term of this patent is extended or adjusted under 35 U.S.C. 154(b) by 135 days.

(21) Appl. No.: 16/862,572

(22) Filed: Apr. 30, 2020

(65) Prior Publication Data

US 2020/0351041 A1    Nov. 5, 2020

Related U.S. Application Data

(60) Provisional application No. 62/842,633, filed on May 3, 2019.

(51) Int. Cl.
*H04L 5/00* (2006.01)
*H04W 24/10* (2009.01)
*H04L 1/06* (2006.01)

(52) U.S. Cl.
CPC .......... *H04L 5/0098* (2013.01); *H04L 5/0092* (2013.01); *H04W 24/10* (2013.01); *H04L 1/0693* (2013.01); *H04L 5/001* (2013.01)

(58) Field of Classification Search
CPC ..... H04L 5/0092; H04L 5/0098; H04W 24/10
See application file for complete search history.

(56) References Cited

U.S. PATENT DOCUMENTS

| 2016/0073370 A1* | 3/2016 | Axmon ................. H04L 5/0048 370/350 |
| 2018/0192300 A1* | 7/2018 | Kazmi .................. H04W 16/14 |
| 2019/0132109 A1  | 5/2019 | Zhou et al. |
| 2020/0112419 A1* | 4/2020 | Bagheri ................ H04L 5/0041 |
| 2020/0229257 A1* | 7/2020 | Venugopal ........... H04B 7/0695 |

FOREIGN PATENT DOCUMENTS

| WO | WO 2014169576 A1 | 10/2014 |
| WO | WO 2017030478 A1 | 2/2017 |

OTHER PUBLICATIONS

China National Intellectual Property Administration, International Search Report and Written Opinion for PCT/CN2020/088305, Jul. 30, 2020.
Intel Corp., Discussion on SCell activation delay in FR2, 3GPP TSG-RAN WG4 Meeting #90bis, R4-1902906, Xi'an, China, Apr. 8-12, 2019.
Catt, Further discussion on SCell activation requirement for the first SCell in an FR2 band, 3GPP TSG-RAN WG4 Meeting #90bis, R4-1903221, Xi'an, China, Apr. 8-12, 2019.
Huawei et al., Further discussion on SCell activation requirements, 3GPP TSG-RAN WG4 Meeting #90bis, R4-1903763, Xi'an, China, Apr. 8 -12, 2019.

(Continued)

*Primary Examiner* — Kevin C. Harper
(74) *Attorney, Agent, or Firm* — Han IP PLLC; Andy M. Han (57) ABSTRACT

An apparatus receives, from a wireless network, a secondary cell (SCell) activation command. The apparatus determines whether a target SCell is known. Based on a result of the determining, the apparatus performs one or more operations.

17 Claims, 8 Drawing Sheets

(56) References Cited

OTHER PUBLICATIONS

Ericsson, RRM specification structure for NR unlicensed, 3GPP TSG-RAN WG4 Meeting #90bis, R4-1904156, Xi'an, China, Apr. 8-12, 2019.
Nokia et al., Discussion on NR SCell activation delay in FR2, 3GPP TSG-RAN WG4 Meeting #90bis, R4-1904287, Xi'an, China, Apr. 8-12, 2019.
Oualcomm Inc., SCell Activation Timeline in FR2, 3GPP TSG-RAN WG4 Meeting #90bis, R4-1904330, Xi'an, China, Apr. 8-12, 2019.
Qualcomm Inc., WF on Scell Activation Delay in FR2, R4-1904696, Apr. 15, 2019.

* cited by examiner

SECONDARY CELL ACTIVATION WITH BEAM MANAGEMENT IN NEW RADIO MOBILE COMMUNICATIONS

CROSS REFERENCE TO RELATED PATENT APPLICATION

The present disclosure is part of a non-provisional patent application claiming the priority benefit of U.S. Provisional Patent Application No. 62/842,633, filed on 3 May 2019, the content of which being incorporated by reference in its entirety.

TECHNICAL FIELD

The present disclosure is generally related to mobile communications and, more particularly, to secondary cell (SCell) activation with beam management in New Radio (NR) mobile communications.

BACKGROUND

Unless otherwise indicated herein, approaches described in this section are not prior art to the claims listed below and are not admitted as prior art by inclusion in this section.

In mobile communications such as $5^{th}$-Generation (5G)/New Radio (NR) mobile communications, a user equipment (UE) needs to know the transmission configuration indication (TCI) state as part of SCell activation. For an unknown cell, a certain procedure is assumed. That is, a network node (e.g., gNB) of a mobile network sends the UE a SCell activation command. In response, the UE sends a Layer 1 (L1) reference signal received power (RSRP) report to the network node, which in turn sends a TCI state activation command to the UE and indicates to the UE which channel state information reference signal (CSI-RS) is to use for channel quality indicator (CQI) reporting. The UE then reports valid CQI to the network node. Components needed in the case of an unknown cell include, for example, time for decoding of medium access control (MAC) control element (CE) for SCell activation ($T_{MAC-CE,\ SCell\ Activation}$), time for decoding of MAC CE for TCI activation ($T_{MAC-CE,\ TCI\ Activation}$), time for L1 RSRP ($T_{L1-RSRP}$), time for CSI reporting ($T_{CSI\_Reporting}$), time for cell search ($T_{CellSearch}$), time for automatic gain control ($T_{AGC}$).

In contrast, for a known cell, the network node can send both SCell activation and TCI state activation commands at the same time. That is, the network node indicates to the UE which CSI-RS to use for CQI reporting, and the UE reports valid CQI. Components needed in the case of a known cell include, for example, $T_{MAC-CE,\ SCell\ Activation}$, $T_{MAC-CE,\ TCI\ Activation}$, time for fine synchronization ($T_{FineTiming}$) and $T_{CSI\_Reporting}$.

The impact between SCell activation and TCI state activation needs to be clarified. For instance, outdated TCI state activation command is not useful, and TCI activation that is too late would delay the activation procedure. Therefore, there is a need for NR SCell activation with TCI configurations.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to SCell activation with beam management in mobile communications. Under various proposed schemes in accordance with the present disclosure, various approaches to NR SCell activation with TCI configurations are provided.

In one aspect, a method may involve a processor of an apparatus receiving, from a wires network, a SCell activation command. The method may also involve the processor determining whether a target SCell is known. The method may further involve the processor performing one or more operations based on a result of the determining.

In one aspect, a method may involve a processor of an apparatus transmitting, to a wires network, a L1 or Layer 3 (L3) RSRP report. The method ma also involve the processor receiving, from the wireless network, a SCell activation command and a TCI state activation command. The method may further involve the processor performing one or more operations responsive to the TCI state activation command being received after a duration later than receiving the SCell activation command.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to SCell activation with beam management in mobile communications. According to the present disclosure, a number of possible solutions may be implemented separately or jointly. That is, although these possible solutions may be described below separately, two or more of these possible solutions may be implemented in one combination or another.

Figure 1:
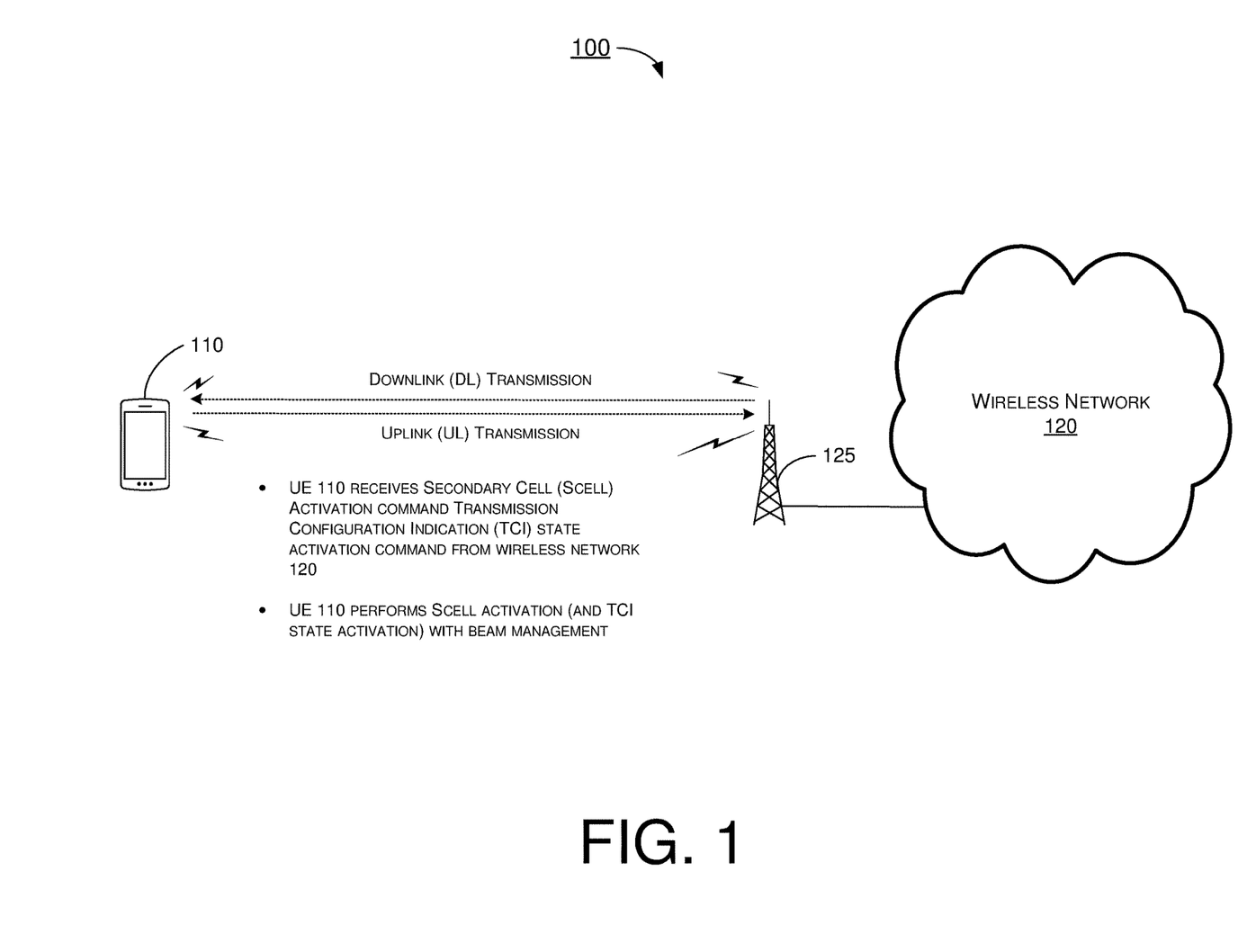
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2, FIG. 3, FIG. 4 and FIG. 5 illustrate example scenarios 200, 300, 400 and 500, respectively, in accordance with implementations of the present disclosure. Each of scenarios 200, 300, 400 and 500 may be implemented in network environment 100. The following description of various proposed schemes is provided with reference to FIG. 1~FIG. 5.

Referring to FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)) and perform SCell activation with beam management based on any of the proposed schemes in accordance with the present disclosure, as described herein.

In the present disclosure, for the first SCell activation in frequency range 2 (FR2) bands, the SCell is considered "known" in case it has been meeting certain conditions. In one condition, during a period of time for UE 110 supporting power class 1 (e.g., 4s) and for UE supporting power class 2/3/4 (e.g., 3s) before UE 110 receives a latest activation command for a physical downlink control channel (PDCCH) TCI, physical downlink shared channel (PDSCH) TCI (when applicable) and semi-persistent CSI-RS for CQI reporting (when applicable). For instance, UE 110 may have transmitted a valid L3 RSRP measurement report with a synchronization signal block (SSB) index. Additionally, or alternatively, a SCell activation command may be received after L3-RSRP reporting and no later than the time when UE 110 receives a MAC-CE command for TCI activation (that is, L3-RSRP reporting is before reception of SCI activation which is before reception of a TCI state activation command for a control resource set (CORESET)). In another condition, during the period from L3-RSRP reporting to a valid CQI reporting, the reported SSBs with indexes remaining detectable according to cell identification conditions specified in pertinent 3$^{rd}$ Generation Project Partnership (3GPP) technical specification (TS) (e.g., TS 38.133), and the TCI state may be selected based on one of the latest reported SSB indexes.

In an event that the target SCell is known to UE 110 and semi-persistent CSI-RS is used for CSI reporting, then the activation time ($T_{activation}$) may be $T_{FineTiming}$+5 ms in case UE 110 receives a SCell activation command, a semi-persistent CSI-RS activation command and a TCI state activation command at the same time. Alternatively, $T_{activation}$ may be an uncertain amount of time for MAC decoding ($T_{undertainty\_MAC}$)+$T_{FineTiming}$+5 ms in case UE 110 receives the TCI state activation command after receiving the SCell activation command. Otherwise, in an event that the target SCell is known to UE 110 and periodic CSI-RS is used for CSI reporting, then $T_{activation}$ may be the either $T_{undertainty\_MAC}$+5 ms+$T_{FineTiming}$ or an uncertain amount of time for radio resource control (RRC) decoding ($T_{undertainty\_RRC}$)+a RRC delay ($T_{RRC\_delay}$)–a hybrid automatic repeat request (HARQ) decoding time ($T_{HARQ}$), which may be expressed as max[($T_{undertainty\_MAC}$+5 ms+$T_{FineTiming}$), ($T_{undertainty\_RRC}$+$T_{RRC\_delay}$−$T_{HARQ}$)]. Here, $T_{undertainty\_MAC}$=0 in case UE 110 receives the SCell activation command and TCI state activation command at the same time.

In an event that the target SCell is unknown to UE 110 and semi-persistent CSI-RS is used for CSI reporting, and given that the side condition Ês/Iot≥−2 dB is fulfilled, then $T_{activation}$ may be 8 ms+24*time for reference signal ($T_{rs}$)+$T_{undertainty\_MAC}$+time for L1-RSRP measurement ($T_{L1\text{-}RSRP,\ measurement}$)+$T_{HARQ}$+$T_{FineTiming}$. Otherwise, in an event that the target SCell is unknown to UE 110 and periodic CSI-RS is used for CSI reporting, and given that the side condition Ês/Iot≥−2 dB is fulfilled, then $T_{activation}$ may be −3 ms+24*$T_{rs}$+$T_{L1\text{-}RSRP,\ measurement}$+time for L1-RSRP reporting ($T_{L1\text{-}RSRP,\ report}$)+max[($T_{HARQ}$+$T_{undertainty\_MAC}$+5 ms+$T_{FineTiming}$), ($T_{undertainty\_RRC}$+$T_{RRC\_delay}$)].

Figure 2:
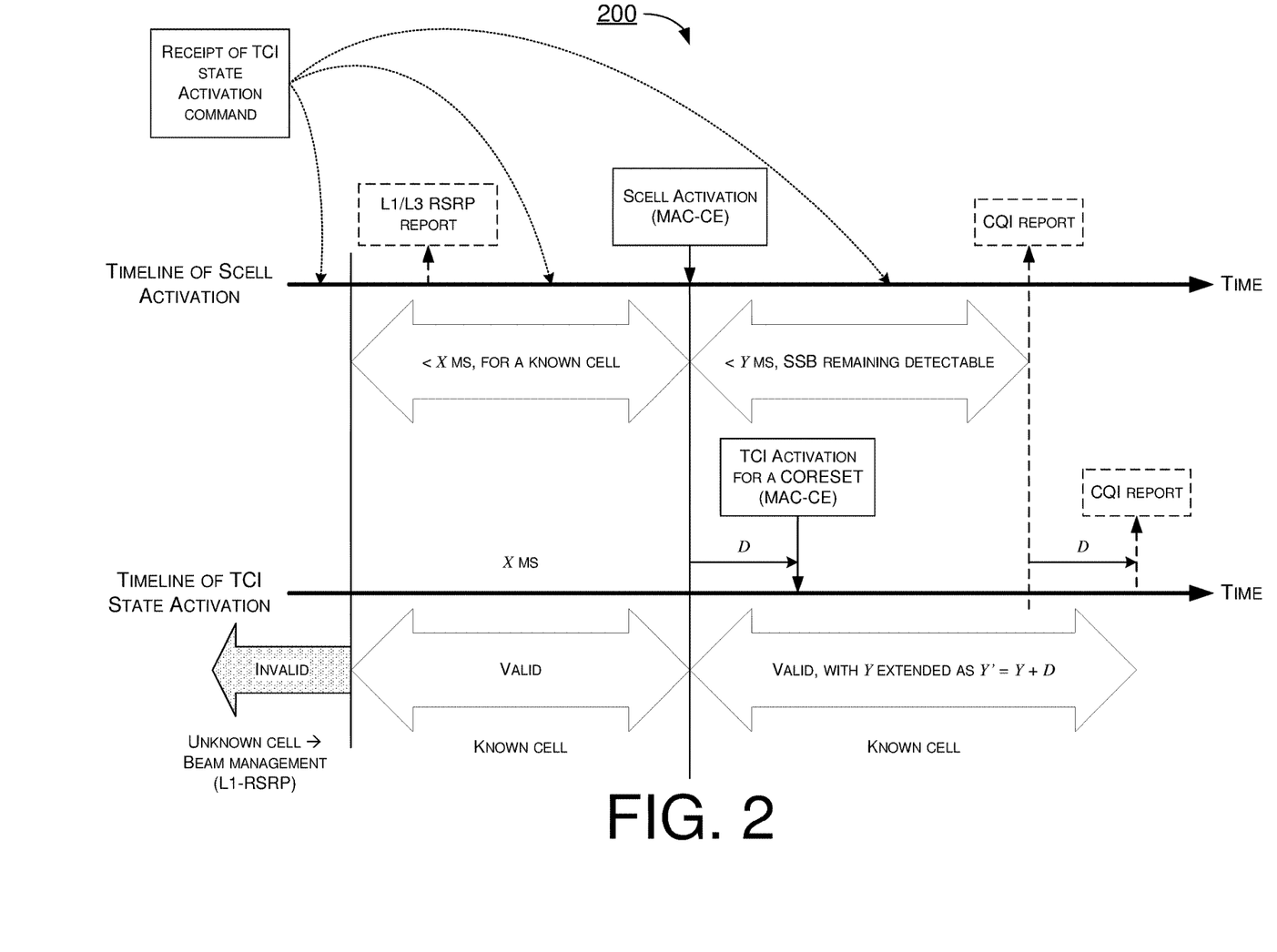
FIG. 2 is a diagram of an example scenario in accordance with an implementation of the present disclosure.

Referring to FIG. 2, in scenario 200 in accordance with the present disclosure, for a known cell a TCI state activation command that is considered valid would not be received more than a threshold amount of time (X ms) before receipt of a SCell activation command. Moreover, in case the TCI state activation command is received after receipt of the SCell activation command by more than a certain amount of time (D ms), then an amount of activation delay (Y ms) may be extended by that amount of time (D ms). The activation delay (Y ms) may include, for example and without limitation, a medium access control (MAC) decoding time, time for fine synchronization ($T_{FineTiming}$), or a combination of the two. For instance, Y ms may be expressed as $T_{FineTiming}$+5 ms (=MAC decoding+processing time). Moreover, for the activation delay, TCI activation of a PDSCH may also be considered.

Under various proposed schemes in accordance with the present disclosure, a SCell activation procedure may be performed, executed or otherwise carried out for a known SCell in FR2 in a number of steps or stages as described below. At a first step (step 1), UE 110 may transmit a L1 or L3 RSRP report to wireless network 120 via network node 125. For a SSB-based report, the L1/L3 RSRP report may include a SSB index. At a second step (step 2), UE 110 may receive a SCell activation command from network node 125 within X ms after transmission of the L1/L3 RSRP report. At a third step (step 3a), in case UE 110 receives a TCI state activation command from network node 125 no more than X ms before receiving the SCell activation command, UE 110 may transmit a CSI report to network node 125 within Y ms after receipt of the SCell activation command and UE 110 may also apply the received TCI state activation command for TCI activation for a CORESET. Here, X may be 80, 160, 320 or 640, and Y may denote SCell activation delay including MAC decoding time and/or fine synchronization time. At an alternate third step (step 3b), in case UE 110 receives the TCI state activation command from network node 125 within D ms after receipt of the SCell activation command, UE 110 may transmit the CSI report to network node 125 within Y+D ms after receipt of the SCell activation command and UE 110 may also apply the received TCI state activation command for TCI activation for a CORESET. Here, Y may denote SCell activation delay including MAC decoding time and/or fine synchronization time, and D ms may be up to a predefined maximum amount of time ($D_{max}$) such as 160 ms or 320 ms. For instance, Y ms may be expressed as $T_{FineTiming}$+5 ms (=MAC decoding+processing time).

Under various proposed schemes in accordance with the present disclosure, a SCell activation procedure may be performed, executed or otherwise carried out for an unknown SCell in FR2 in a number of steps or stages as described below. At a first step (step 1), UE 110 may receive a SCell activation command, and UE 110 may consider such a corresponding SCell activation as unknown SCell activation when a condition is met. For instance, UE 110 may consider the SCell activation as unknown SCell activation when UE 110 receives the SCell activation command more than X ms after transmission of a latest L1 or L3 RSRP report by UE 110. Alternatively, UE 110 may consider the SCell activation as unknown SCell activation when UE 110 receives the SCell activation command more than X ms after reception of a latest TCI state activation command by UE 110. At a second step (step 2), UE 110 may perform beam management (BM) procedure(s) and report L1 RSRP to wireless network 120 via network node 125. The BM procedure(s) may include, for example and without limitation, SSB-based L1-RSRP measurement and CSI-RS-based L1-RSRP measurement. At a third step (step 3), wireless network 120 may transmit, via network node 125, a TCI state activation command to UE 110. At a fourth step (step 4), UE 110 may transmit a CSI report to wireless network 120 according to a corresponding TCI state activation command, and UE 110 may also apply the most-recently received TCI state activation command for TCI activation for a CORESET.

Figure 3:
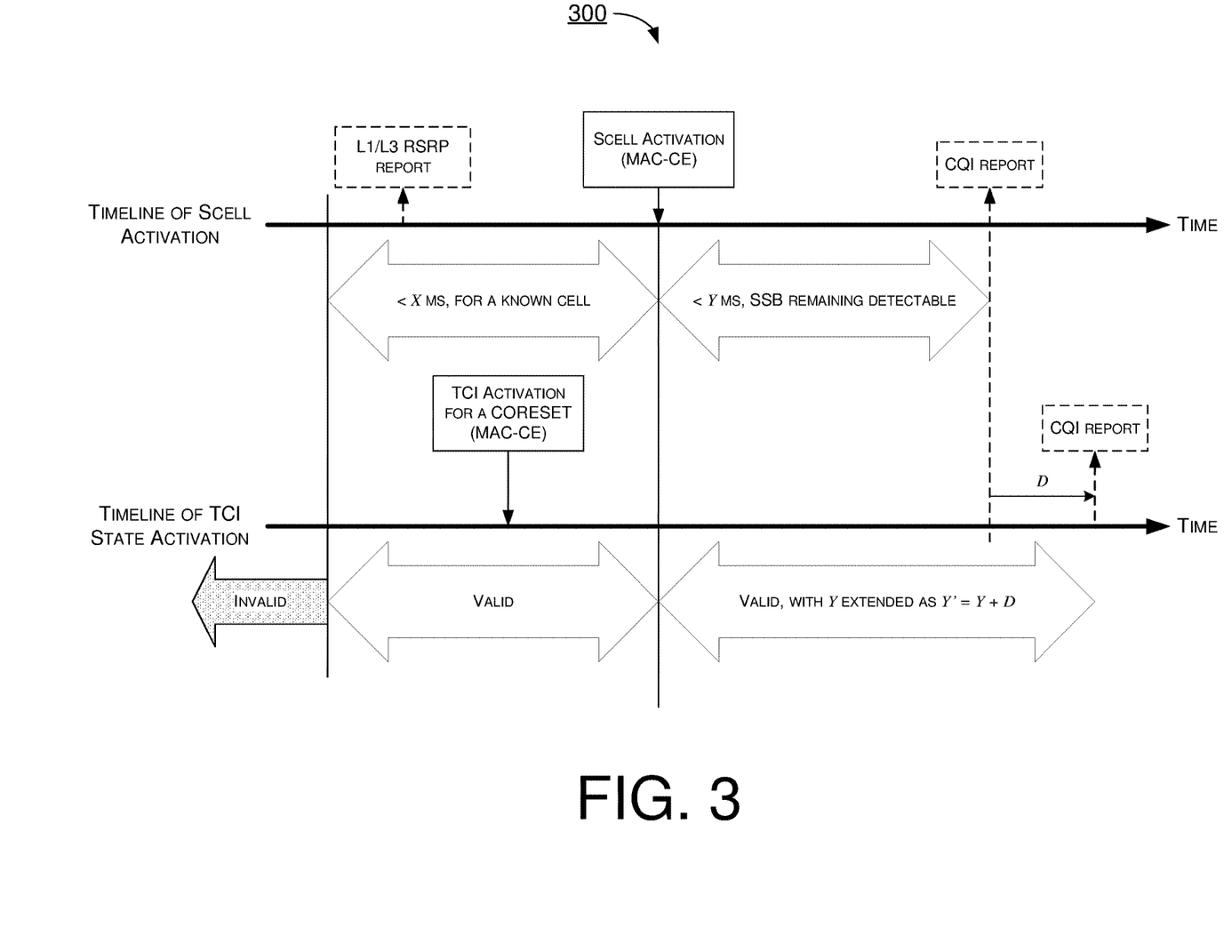
FIG. 3 is a diagram of an example scenario in accordance with an implementation of the present disclosure.

Referring to FIG. 3, in scenario 300 in accordance with the present disclosure, UE 110 may receive a SCell activation command within X ms after transmission of L1 or L3 RSRP report to network node 125 by UE 110 (e.g., within 80 ms, 160 ms, 320 ms or 640 ms of transmission of the L1/L3 RSRP report). In case UE 110 receives a TCI state activation command within X ms before reception of a SCell activation command (that is, UE 110 receives the TCI state activation command before receiving the SCell activation command), UE 110 may transmit a CSI report (e.g., CQI report) to network node 125 within Y ms after reception of the SCell activation command. Here, Y may denote SCell activation delay including MAC decoding time and/or fine synchronization time.

Figure 4:
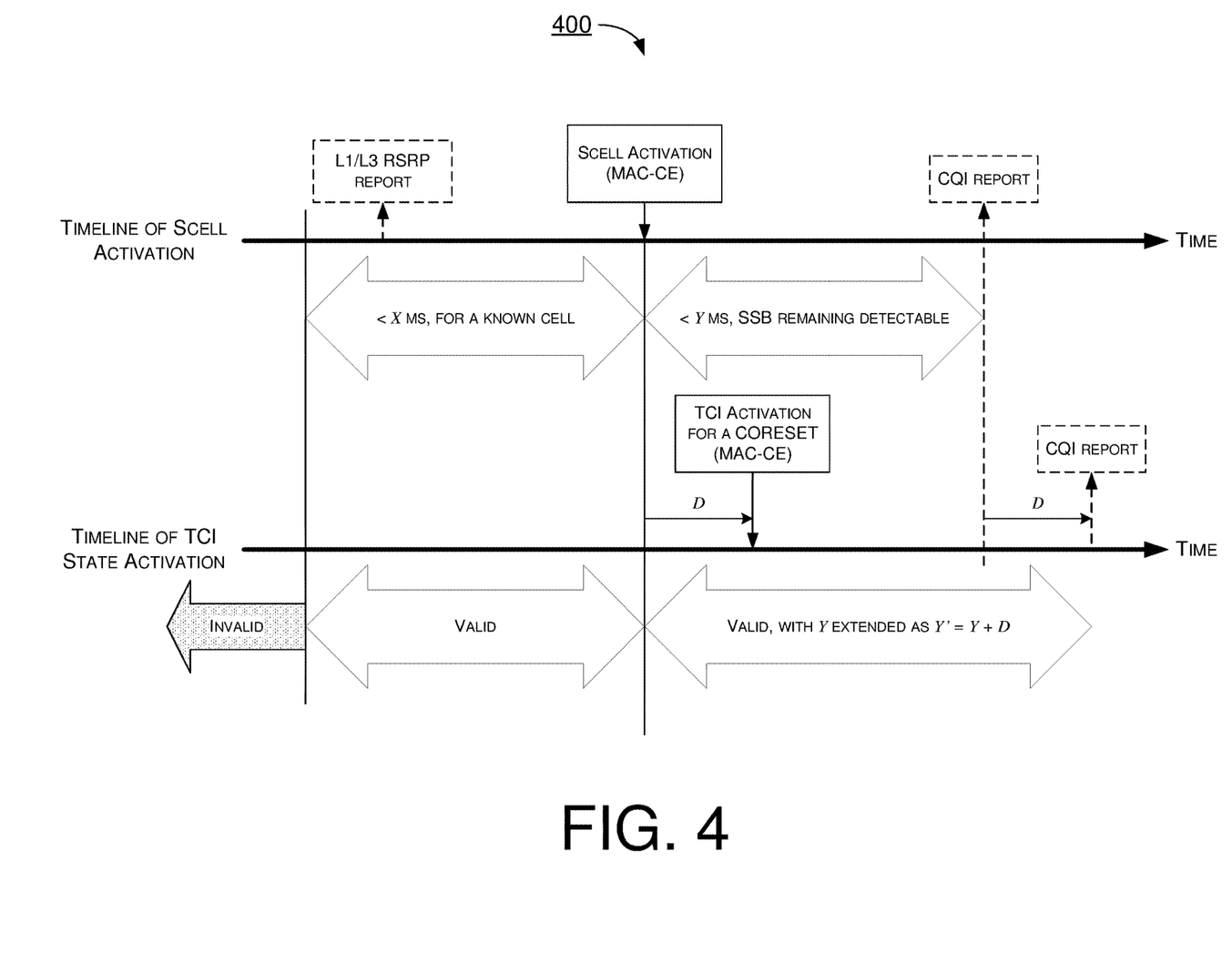
FIG. 4 is a diagram of an example scenario in accordance with an implementation of the present disclosure.

Referring to FIG. 4, in scenario 400 in accordance with the present disclosure, UE 110 may receive a SCell activation command within X ms after transmission of L1 or L3 RSRP report to network node 125 by UE 110 (e.g., within 80 ms, 160 ms, 320 ms or 640 ms of transmission of the L1/L3 RSRP report). In case UE 110 receives a TCI state activation command within D ms after reception of the SCell activation command (that is, UE 110 receives the SCell activation command before receiving the TCI state activation command), UE 110 may transmit a CSI report (e.g., CQI report) to network node 125 within Y+D ms after reception of the SCell activation command. Here, Y may denote a non-extended duration (e.g., SCell activation delay) including MAC decoding time and/or fine synchronization time, and D ms may be up to a predefined maximum amount of time ($D_{max}$) such as 160 ms or 320 ms.

Figure 5:
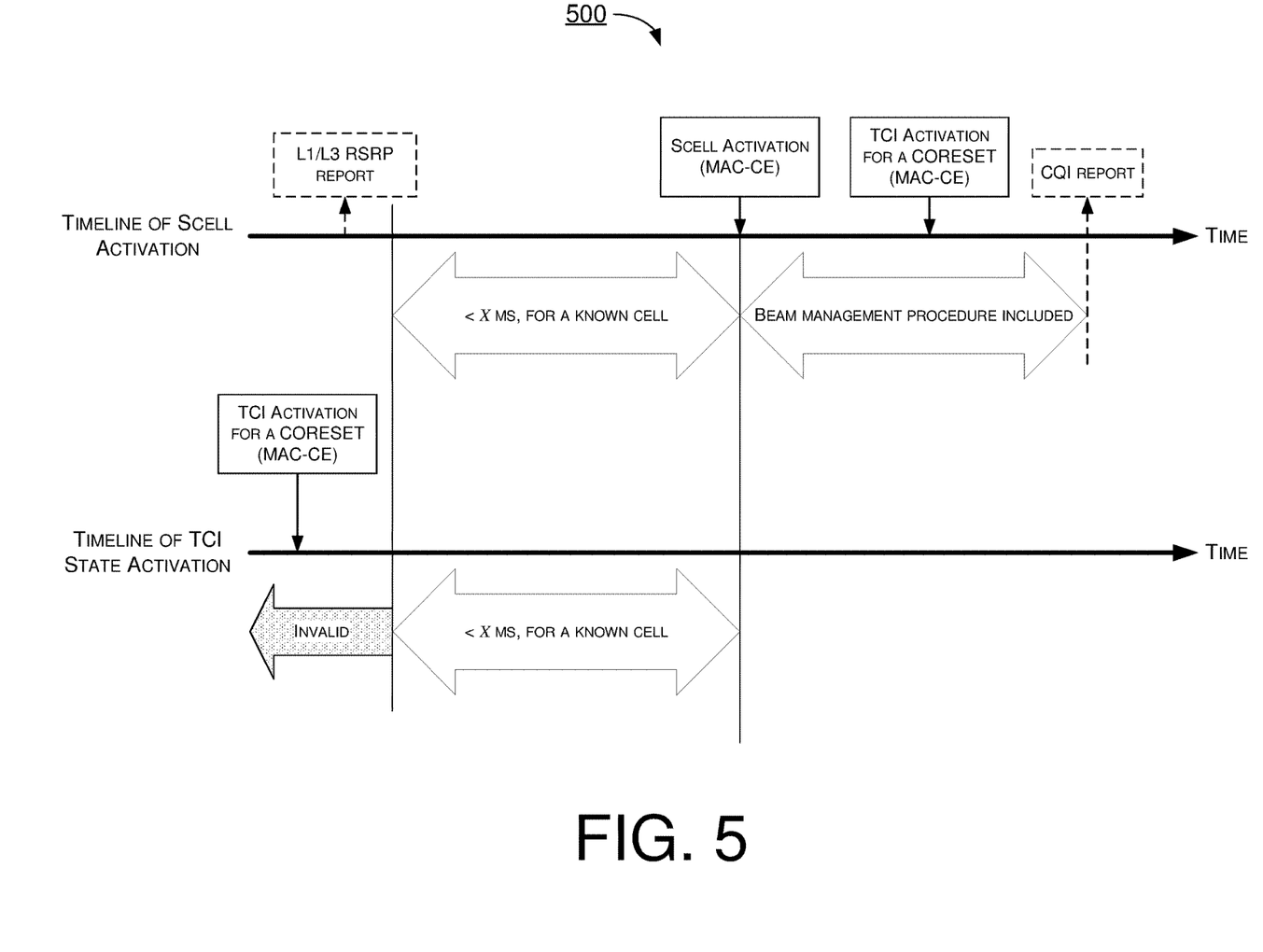
FIG. 5 is a diagram of an example scenario in accordance with an implementation of the present disclosure.

Referring to FIG. 5, in scenario 500 in accordance with the present disclosure, in case UE 110 receives a SCell activation command more than X ms (e.g., 80 ms, 160 ms, 320 ms or 640 ms) after transmission of a latest L1 or L3 RSRP report to network node 125 by UE 110 or in case UE 110 receives the SCell activation command more than X ms after reception of a latest TCI state activation command from network node 125 by UE 110, then UE 110 may consider SCell activation corresponding to the SCell activation command as unknown SCell activation. Accordingly, UE 110 may perform BM and report L1-RSRP to wireless network 120 via network node 125. Wireless network 120 may transmit, via network node 125, a TCI state activation command to UE 110. Correspondingly, UE 110 may transmit a CSI report (e.g., CQI report) to wireless network 120 according to the latest TCI state activation command.

Illustrative Implementations

Figure 6:
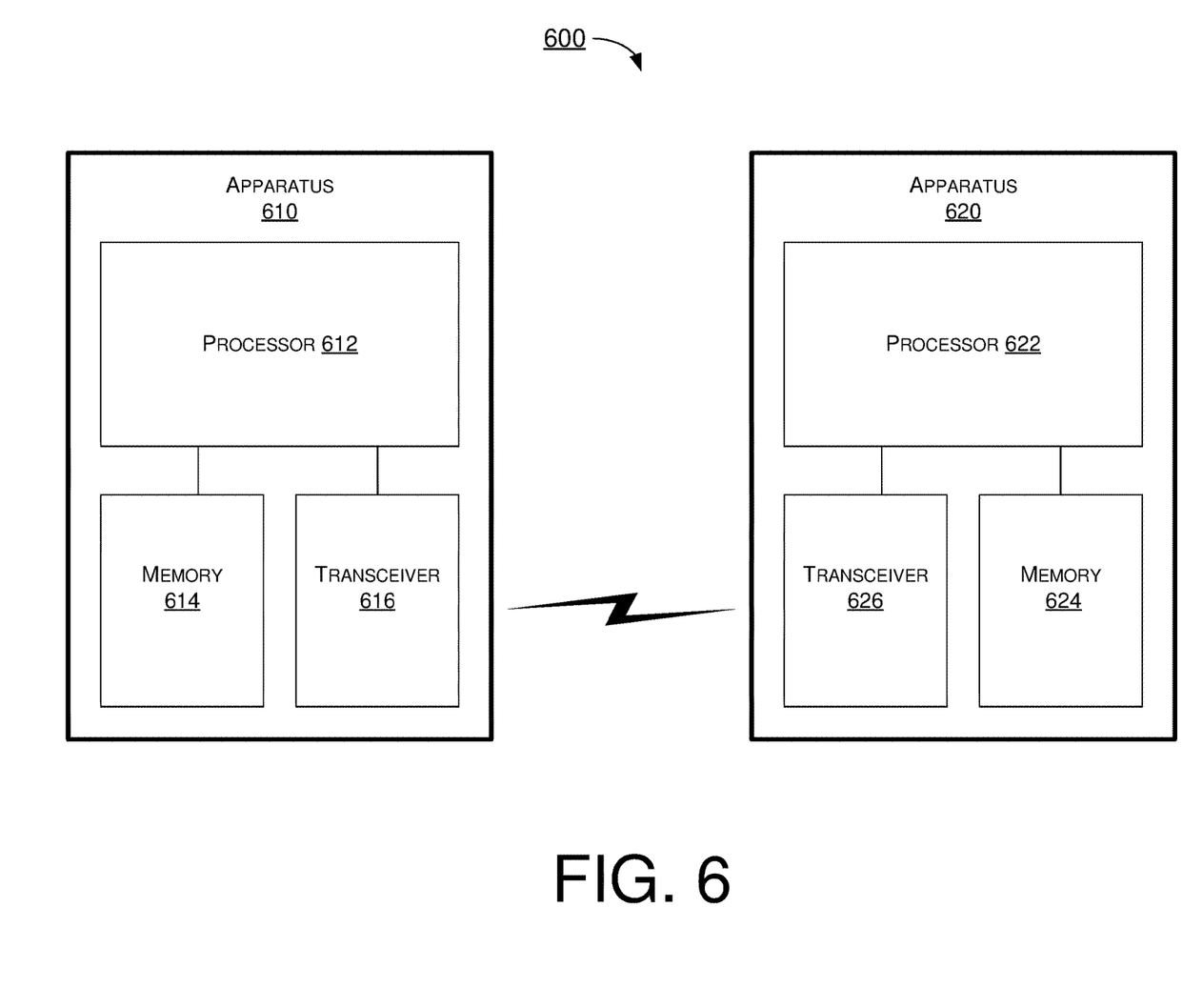
FIG. 6 is a block diagram of an example communication system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to SCell activation with beam management in NR mobile communications, including the various schemes described above with respect to various proposed designs, concepts, schemes, systems and methods described above as well as processes described below. For instance, apparatus 610 may be an example implementation of UE 110, and apparatus 620 may be an example implementation of network node 125.

Each of apparatus 610 and apparatus 620 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node (e.g., network node 125), such as an eNB in an LTE, LTE-Advanced or LTE-Advanced Pro network or in a gNB or TRP in a 6G network, an NR network or an IoT network.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 610 and apparatus 620 may be implemented in or as a network apparatus or a UE. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more RISC or CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to SCell activation with beam management in NR mobile communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as a UE, and apparatus 620, as a base station of a serving cell of a wireless network (e.g., 6G/NR mobile network), is provided below. It is noteworthy that, although the example implementations described below are provided in the context of a UE, the same may be implemented in and performed by a base station. Thus, although the following description of example implementations pertains to apparatus 610 as a UE (e.g., UE 110), the same is also applicable to apparatus 620 as a network node or base station such as a gNB, TRP or eNodeB (e.g., network node 125) of a wireless network (e.g., wireless network 120) such as a 6G NR mobile network.

In one aspect of SCell activation with beam management in NR mobile communications in accordance with a proposed scheme of the present disclosure, processor 612 of apparatus 610 may receive, via transceiver 616, from a wireless network (e.g., wireless network 120) via apparatus 620 as network node 125 a SCell activation command. Moreover, processor 612 may determine whether a target SCell is known. Furthermore, processor 612 may perform one or more operations based on a result of the determining.

In some implementations, processor 612 may perform additional operations. For instance, processor 612 may receive, via transceiver 616, from the wireless network a TCI state activation command after a duration (D) later than receiving the SCell activation command. In an event that the target SCell is known, in performing the one or more operations, processor 612 may perform certain operations. For instance, processor 612 may transmit, via transceiver 616, to the wireless network a CSI report within an extended duration (Y') after the receiving of the SCell activation command. Moreover, processor 612 may apply the TCI state activation command. In such cases, the extended duration (Y') may be equal to a non-extended duration (Y) plus the duration (D) as denoted by Y'=Y+D. In such cases, the non-extended duration (Y) may be equal to a time for fine synchronization ($T_{FineTiming}$) plus a time for decoding a MAC CE that contains the SCell activation command. Moreover, the duration (D) may be more than 0 ms and up to a predefined value (e.g., 320 ms).

In some implementations, processor 612 may perform additional operations. For instance, processor 612 may receive, via transceiver 616, from the wireless network a TCI state activation command within a predefined duration (X) before receiving the SCell activation command. In an event that the target SCell is known, in performing the one or more operations, processor 612 may perform certain operations. For instance, processor 612 may transmit, via transceiver 616, to the wireless network a CSI report within the non-extended duration (Y) after the receiving of the SCell activation command. Furthermore, processor 612 may apply the TCI state activation command. In such cases, the SCell activation delay (Y) may be equal to a time for fine synchronization ($T_{FineTiming}$) plus a time for decoding a MAC CE that contains the SCell activation command. Moreover, the predefined duration (X) may be 80 ms, 160 ms, 320 ms or 640 ms.

In some implementations, processor 612 may perform additional operations. For instance, processor 612 may transmit, via transceiver 616, to the wireless network a L1 or L3 RSRP report. In such cases, in determining whether the target SCell is known, processor 612 may perform certain operations. For instance, processor 612 may determine that the target SCell is known responsive to the L1 or L3 RSRP report having been transmitted before the receiving of the SCell activation command by no more than a predefined duration (X). Additionally, processor 612 may determine that the target SCell is unknown responsive to the L1 or L3 RSRP report having not been transmitted or having been transmitted before the receiving of the SCell activation command by more than the predefined duration (X).

In some implementations, processor 612 may perform additional operations. For instance, processor 612 may transmit, via transceiver 616, to the wireless network a L1 or L3 RSRP report. Alternatively, processor 612 may receive, via transceiver 616, from the wireless network a TCI state activation command before receiving the SCell activation command. In such cases, in determining whether the target SCell is known, processor 612 may determine that the target SCell is unknown in response to either (a) the SCell activation command being received more than a predefined duration (X) after the transmitting of the L1 or L3 RSRP report or (b) the SCell activation command being received more than the predefined duration (X) after the receiving of the TCI state activation command. In some implementations, in performing the one or more operations, processor 612 may perform certain operations. For instance, processor 612 may perform a beam management procedure. Additionally, processor 612 may transmit, via transceiver 616, to the wireless network a L1 RSRP report. Moreover, processor 612 may receive, via transceiver 616, from the wireless network a second TCI state activation command. Furthermore, processor 612 may apply the second TCI state activation command.

In another aspect of SCell activation with beam management in NR mobile communications in accordance with a proposed scheme of the present disclosure, processor 612 of apparatus 610 may transmit, via transceiver 616, to a wireless network (e.g., wireless network 120) via apparatus 620 as network node 125 a L1 or L3 RSRP report. Additionally, processor 612 may receive, via transceiver 616, from the wireless network a SCell activation command. Moreover, processor 612 may receive, via transceiver 616, from the wireless network a TCI state activation command. Furthermore, processor 612 may perform one or more operations responsive to the TCI state activation command being received after a duration (D) later than receiving the SCell activation command.

In some implementations, in receiving the SCell activation command, processor 612 may receive the SCell activation command within a second predefined duration (X) after transmitting the L1 or L3 RSRP report. In such cases, the second predefined duration (X) may be 80 ms, 160 ms, 320 ms or 640 ms.

In some implementations, in receiving the SCell activation command, processor 612 may receive the SCell activation command in a MAC CE.

In some implementations, in performing the one or more operations, processor 612 may perform certain operations. For instance processor 612 may transmit, via transceiver 616, to the wireless network a CSI report. Additionally, processor 612 may apply the TCI state activation command. In some implementations, in transmitting the CSI report, processor 612 may transmit the CSI report within an extended duration (Y') after the receiving of the SCell activation command. In such cases, the extended duration (Y') may be equal to a SCell activation delay (Y) plus the duration (D). Moreover, the SCell activation delay (Y) may be equal to a time for fine synchronization ($T_{FineTiming}$) plus a time for decoding a MAC CE that contains the SCell activation command. Furthermore, the duration (D) may be more than 0 ms and up to a predefined value (e.g., 320 ms).

Illustrative Processes

Figure 7:
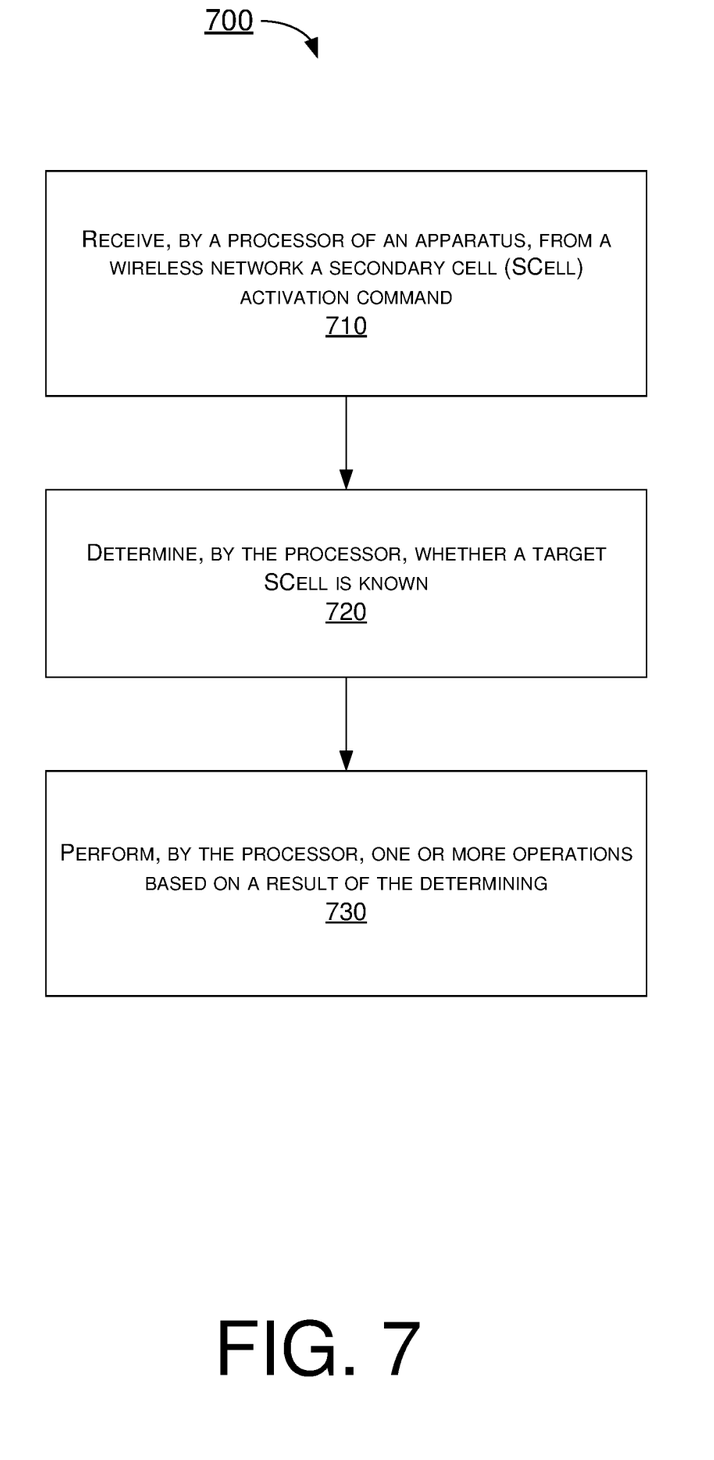
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to SCell activation with beam management in NR mobile communications in accordance with the present disclosure. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative purposes and without limiting the scope, process 700 is described below in the context of apparatus 610 as a UE (e.g., UE 110) and apparatus 620 as a network node (e.g., network node 125) of a wireless network (e.g., wireless network 120) such as a 6G/NR mobile network. Process 700 may begin at block 710.

At 710, process 700 may involve processor 612 of apparatus 610 receiving, via transceiver 616, from a wireless network (e.g., wireless network 120) via apparatus 620 as network node 125 a SCell activation command. Process 700 may proceed from 710 to 720.

At 720, process 700 may involve processor 612 determining whether a target SCell is known. Process 700 may proceed from 720 to 730.

At 730, process 700 may involve processor 612 performing one or more operations based on a result of the determining.

In some implementations, process 700 may involve processor 612 performing additional operations. For instance, process 700 may involve processor 612 receiving, via transceiver 616, from the wireless network a TCI state activation command after a duration (D) later than receiving the SCell activation command. In an event that the target SCell is known, in performing the one or more operations, process 700 may involve processor 612 performing certain operations. For instance, process 700 may involve processor 612 transmitting, via transceiver 616, to the wireless network a CSI report within an extended duration (Y') after the receiving of the SCell activation command. Moreover, process 700 may involve processor 612 applying the TCI state activation command. In such cases, the extended duration (Y') may be equal to a non-extended duration (Y) plus the duration (D) as denoted by Y'=Y+D. In such cases, the non-extended duration (Y) may be equal to a time for fine synchronization ($T_{FineTiming}$) plus a time for decoding a MAC CE that contains the SCell activation command. Moreover, the duration (D) may be more than 0 ms and up to a predefined value (e.g., 320 ms).

In some implementations, process 700 may involve processor 612 performing additional operations. For instance, process 700 may involve processor 612 receiving, via transceiver 616, from the wireless network a TCI state activation command within a predefined duration (X) before receiving the SCell activation command. In an event that the target SCell is known, in performing the one or more operations, process 700 may involve processor 612 performing certain operations. For instance, process 700 may involve processor 612 transmitting, via transceiver 616, to the wireless network a CSI report within the non-extended duration (Y) after the receiving of the SCell activation command. Furthermore, process 700 may involve processor 612 applying the TCI state activation command. In such cases, the SCell activation delay (Y) may be equal to a time for fine synchronization ($T_{FineTiming}$) plus a time for decoding a MAC CE that contains the SCell activation command. Moreover, the predefined duration (X) may be 80 ms, 160 ms, 320 ms or 640 ms.

In some implementations, process 700 may involve processor 612 performing additional operations. For instance, process 700 may involve processor 612 transmitting, via transceiver 616, to the wireless network a L1 or L3 RSRP report. In such cases, in determining whether the target SCell is known, process 700 may involve processor 612 performing certain operations. For instance, process 700 may involve processor 612 determining that the target SCell is known responsive to the L1 or L3 RSRP report having been transmitted before the receiving of the SCell activation command by no more than a predefined duration (X). Additionally, process 700 may involve processor 612 determining that the target SCell is unknown responsive to the L1 or L3 RSRP report having not been transmitted or having been transmitted before the receiving of the SCell activation command by more than the predefined duration (X).

In some implementations, process 700 may involve processor 612 performing additional operations. For instance, process 700 may involve processor 612 transmitting, via transceiver 616, to the wireless network a L1 or L3 RSRP report. Alternatively, process 700 may involve processor 612 receiving, via transceiver 616, from the wireless network a TCI state activation command before receiving the SCell activation command. In such cases, in determining whether the target SCell is known, process 700 may involve processor 612 determining that the target SCell is unknown in response to either (a) the SCell activation command being received more than a predefined duration (X) after the transmitting of the L1 or L3 RSRP report or (b) the SCell activation command being received more than the predefined duration (X) after the receiving of the TCI state activation command. In some implementations, in performing the one or more operations, process 700 may involve processor 612 performing certain operations. For instance, process 700 may involve processor 612 performing a beam management procedure. Additionally, process 700 may involve processor 612 transmitting, via transceiver 616, to the wireless network a L1 RSRP report. Moreover, process 700 may involve processor 612 receiving, via transceiver 616, from the wireless network a second TCI state activation command. Furthermore, process 700 may involve processor 612 applying the second TCI state activation command.

Figure 8:
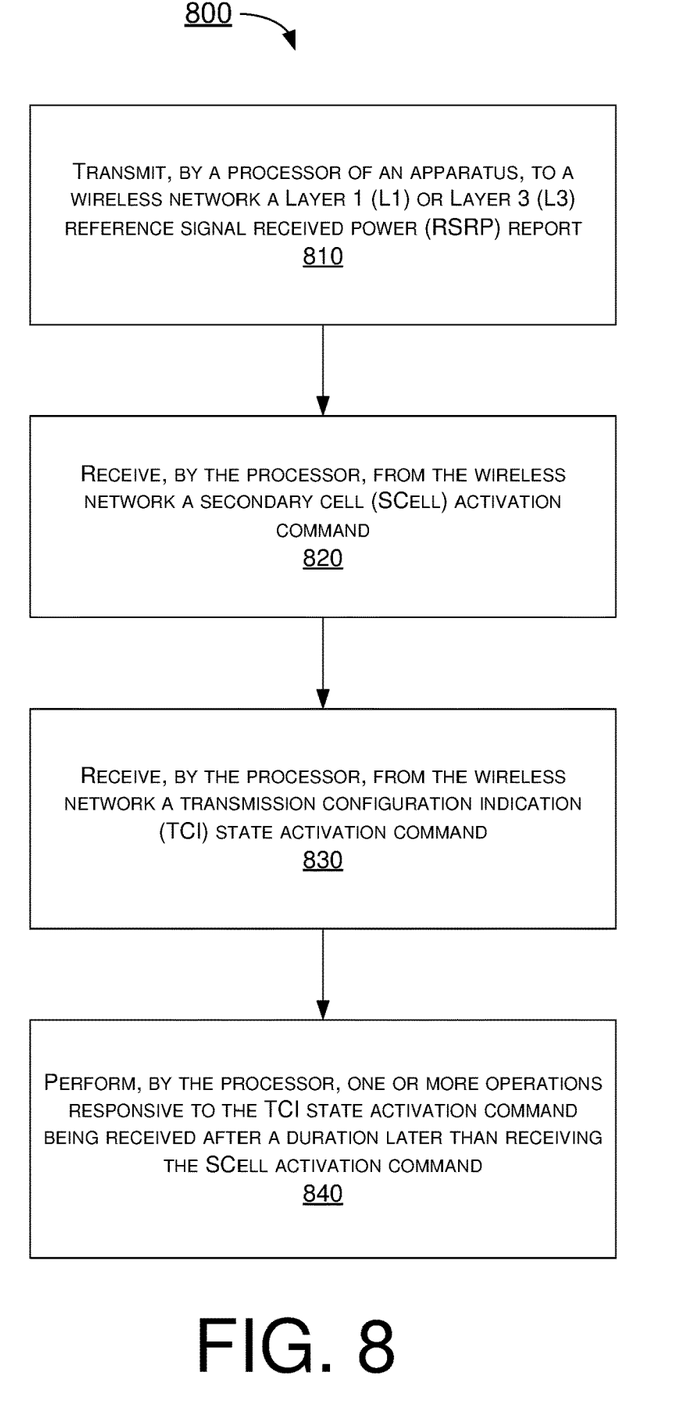
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to SCell activation with beam management in NR mobile communications in accordance with the present disclosure. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative purposes and without limiting the scope, process 800 is described below in the context of apparatus 610 as a UE (e.g., UE 110) and apparatus 620 as a network node (e.g., network node 125) of a wireless network (e.g., wireless network 120) such as a 6G/NR mobile network. Process 800 may begin at block 810.

At 810, process 800 may involve processor 612 of apparatus 610 transmitting, via transceiver 616, to a wireless network (e.g., wireless network 120) via apparatus 620 as network node 125 a L1 or L3 RSRP report. Process 800 may proceed from 810 to 820.

At 820, process 800 may involve processor 612 receiving, via transceiver 616, from the wireless network a SCell activation command. Process 800 may proceed from 820 to 830.

At 830, process 800 may involve processor 612 receiving, via transceiver 616, from the wireless network a TCI state activation command. Process 800 may proceed from 830 to 840.

At 840, process 800 may involve processor 612 performing one or more operations responsive to the TCI state activation command being received after a duration (D) later than receiving the SCell activation command.

In some implementations, in receiving the SCell activation command, process 800 may involve processor 612 receiving the SCell activation command within a second predefined duration (X) after transmitting the L1 or L3 RSRP report. In such cases, the second predefined duration (X) may be 80 ms, 160 ms, 320 ms or 640 ms.

In some implementations, in receiving the SCell activation command, process 800 may involve processor 612 receiving the SCell activation command in a MAC CE.

In some implementations, in performing the one or more operations, process 800 may involve processor 612 performing certain operations. For instance, process 800 may involve processor 612 transmitting, via transceiver 616, to the wireless network a CSI report. Additionally, process 800 may involve processor 612 applying the TCI state activation command. In some implementations, in transmitting the CSI report, process 800 may involve processor 612 transmitting the CSI report within an extended duration (Y') after the receiving of the SCell activation command. In such cases, the extended duration (Y') may be equal to a SCell activation delay (Y) plus the duration (D). Moreover, the SCell activation delay (Y) may be equal to a time for fine synchronization ($T_{FineTiming}$) plus a time for decoding a MAC CE that contains the SCell activation command. Furthermore, the duration (D) may be more than 0 ms and up to a predefined value (e.g., 320 ms).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, from a wireless network a secondary cell (SCell) activation command;
   determining, by the processor, whether a target SCell is known; and
   performing, by the processor, one or more operations based on a result of the determining,
   wherein the determining of whether the target SCell is known comprises:
      determining that the target SCell is known responsive to a Layer 1 (L1) or Layer 3 (L3) reference signal received power (RSRP) report having been transmitted before the receiving of the SCell activation command by no more than a predefined duration (X); and
   determining that the target SCell is unknown responsive to the L1 or L3 RSRP report having not been transmitted or having been transmitted before the receiving of the SCell activation command by more than the predefined duration (X).

2. The method of claim 1, further comprising:
   receiving, by the processor, from the wireless network a transmission configuration indication (TCI) state activation command after a duration (D) later than receiving the SCell activation command,
   wherein, in an event that the target SCell is known, the performing of the one or more operations comprises:
      transmitting to the wireless network a channel state information (CSI) report within an extended duration (Y') after the receiving of the SCell activation command; and
      applying the TCI state activation command,
   wherein the extended duration (Y') is equal to a non-extended duration (Y) plus the duration (D).

3. The method of claim 2, wherein the non-extended duration (Y) is equal to a time for fine synchronization ($T_{FineTiming}$) plus a time for decoding a medium access control (MAC) control element (CE) that contains the SCell activation command.

4. The method of claim 2, wherein the duration (D) is more than 0 ms and up to a predefined value.

5. The method of claim 1, further comprising:
   receiving, by the processor, from the wireless network a transmission configuration indication (TCI) state activation command within a predefined duration (X) before receiving the SCell activation command,
   wherein, in an event that the target SCell is known, the performing of the one or more operations comprises:
      transmitting to the wireless network a channel state information (CSI) report within a non-extended duration (Y) after the receiving of the SCell activation command; and
      applying the TCI state activation command.

6. The method of claim 5, wherein the SCell activation delay (Y) is equal to a time for fine synchronization ($T_{FineTiming}$) plus a time for decoding a medium access control (MAC) control element (CE) that contains the SCell activation command.

7. The method of claim 5, wherein the predefined duration (X) is 80 ms, 160 ms, 320 ms or 640 ms.

8. The method of claim 1, further comprising:
transmitting, by the processor, to the wireless network the L1 or L3 RSRP report.

9. The method of claim 1, further comprising:
performing, by the processor, either:
  transmitting to the wireless network the L1 or L3 RSRP report; or
  receiving from the wireless network a transmission configuration indication (TCI) state activation command before receiving the SCell activation command,
wherein the determining of whether the target SCell is known comprises determining that the target SCell is unknown responsive to:
  the SCell activation command being received more than a predefined duration (X) after the transmitting of the L1 or L3 RSRP report, or
  the SCell activation command being received more than the predefined duration (X) after the receiving of the TCI state activation command.

10. The method of claim 9, wherein the performing of the one or more operations comprises:
performing a beam management procedure; and
transmitting to the wireless network the L1 RSRP report.

11. The method of claim 10, wherein the performing of the one or more operations further comprises:
receiving from the wireless network a second TCI state activation command; and
applying the second TCI state activation command.

12. A method, comprising:
transmitting, by a processor of an apparatus, to a wireless network a Layer 1 (L1) or Layer 3 (L3) reference signal received power (RSRP) report;
receiving, by the processor, from the wireless network a secondary cell (SCell) activation command;
receiving, by the processor, from the wireless network a transmission configuration indication (TCI) state activation command; and
performing, by the processor, one or more operations responsive to the TCI state activation command being received after a duration (D) later than receiving the SCell activation command,
wherein the receiving of the SCell activation command comprises receiving the SCell activation command within a second predefined duration (X) after transmitting the L1 or L3 RSRP report.

13. The method of claim 12, wherein the second predefined duration (X) is 80 ms, 160 ms, 320 ms or 640 ms.

14. A method, comprising:
transmitting, by a processor of an apparatus, to a wireless network a Layer 1 (L1) or Layer 3 (L3) reference signal received power (RSRP) report;
receiving, by the processor, from the wireless network a secondary cell (SCell) activation command;
receiving, by the processor, from the wireless network a transmission configuration indication (TCI) state activation command; and
performing, by the processor, one or more operations responsive to the TCI state activation command being received after a duration (D) later than receiving the SCell activation command,
wherein the performing of the one or more operations comprises:
  transmitting to the wireless network a channel state information (CSI) report; and
  applying the TCI state activation command,
wherein the transmitting of the CSI report comprises transmitting the CSI report within an extended duration (Y') after the receiving of the SCell activation command, and
wherein the extended duration (Y') is equal to a SCell activation delay (Y) plus the duration (D).

15. The method of claim 14, wherein the SCell activation delay (Y) is equal to a time for fine synchronization ($T_{FineTiming}$) plus a time for decoding a medium access control (MAC) control element (CE) that contains the SCell activation command.

16. The method of claim 14, wherein the duration (D) is more than 0 ms and up to a predefined value.

17. The method of claim 16, wherein the predefined value is 320 ms.

* * * * *